US007962721B1

(12) United States Patent
King et al.

(10) Patent No.: US 7,962,721 B1
(45) Date of Patent: Jun. 14, 2011

(54) METHOD AND APPARATUS FOR MANAGEMENT OF BUS TRANSACTIONS RELATING TO SHARED RESOURCES

(75) Inventors: James E. King, Wokingham (GB); Rhod J. Jones, Crowthorne (GB); Paul J. Garnett, Camberley (GB)

(73) Assignee: Oracle America, Inc., Redwood City, CA (US)

( * ) Notice: Subject to any disclaimer, the term of this patent is extended or adjusted under 35 U.S.C. 154(b) by 2336 days.

(21) Appl. No.: 10/838,932

(22) Filed: May 4, 2004

(51) Int. Cl.
G06F 15/76 (2006.01)
G06F 15/167 (2006.01)
(52) U.S. Cl. .............................. 712/34; 712/11; 709/213
(58) Field of Classification Search .................. 709/219, 709/214; 712/11, 34
See application file for complete search history.

(56) References Cited

U.S. PATENT DOCUMENTS

| 6,233,635 | B1 * | 5/2001 | Son ............................. 710/315 |
| 6,247,078 | B1 | 6/2001 | Ebert et al. |
| 6,452,809 | B1 | 9/2002 | Jackson et al. |
| 6,510,484 | B1 * | 1/2003 | Kim et al. ..................... 710/314 |
| 6,556,438 | B1 | 4/2003 | Bolognia et al. |
| 6,583,989 | B1 | 6/2003 | Guyer et al. |
| 6,594,150 | B2 | 7/2003 | Creason et al. |
| 6,654,252 | B2 | 11/2003 | Raynham |
| 6,742,068 | B2 | 5/2004 | Gallagher et al. |
| 6,810,475 | B1 * | 10/2004 | Tardieux ...................... 712/219 |
| 2002/0124114 | A1 | 9/2002 | Bottom |
| 2003/0009651 | A1 * | 1/2003 | Najam et al. ................... 712/34 |
| 2003/0079074 | A1 * | 4/2003 | Sicola et al. ................. 710/305 |
| 2003/0105909 | A1 * | 6/2003 | Mennekens et al. .......... 710/305 |
| 2004/0255071 | A1 * | 12/2004 | Larson et al. ................. 710/306 |

* cited by examiner

Primary Examiner — Andrew Caldwell
Assistant Examiner — Lin Liu
(74) Attorney, Agent, or Firm — Meyertons, Hood, Kivlin, Kowert & Goetzel, P.C.

(57) ABSTRACT

There is provided an information processing apparatus. The apparatus comprises: a processor; at least one I2C device; and a processor support chip. The processor support chip comprises a local service controller and a jointly addressable memory space and has an interface to the processor for the transfer of information therebetween. The processor support chip also has an interface for communication with a service processor; and an I2C interface for communication with the at least one I2C device. The local service controller has exclusive read and write access to the I2C interface; and is operable to maintain a data structure indicating a current value associated with the I2C device in the jointly addressable memory space for access by the processor and the service processor.

30 Claims, 9 Drawing Sheets

METHOD AND APPARATUS FOR MANAGEMENT OF BUS TRANSACTIONS RELATING TO SHARED RESOURCES

BACKGROUND OF THE INVENTION

The present invention relates to bus control and in particular, but not exclusively, to control of an I2C bus by proxy server with write-through cache.

One application for the present invention relates to high density computer systems, for example, computer server systems for telecommunications applications. In telecommunications applications, it is important to provide high reliability and high capacity of operation. Various approaches have been taken to providing such high-performance, high reliability systems. One factor in providing high reliability is providing an operating environment which is optimised against firmware or software errors during operation. Such errors can include memory allocation errors and conflicts, and illegal instruction sequences. Design of computer systems to minimise the risk of such errors is therefore an integral part of designing high reliability computer systems.

The present invention relates to management of a shared memory resource for high performance without compromising system reliability.

SUMMARY OF THE INVENTION

A first aspect provides an information processing apparatus. The apparatus comprises: a processing engine; at least one ancillary device; a remote management entity; a store; and a local management entity. The local management entity has an interface to the at least one ancillary device, an interface to the processing engine and an interface to the remote management entity. The store is directly addressable by the local management entity, the processing engine and the remote management entity. The local management entity is operable to perform read and/or write operations with respect to the at least one ancillary device and to provide information relating to the at least one ancillary device in the store.

This arrangement provides a proxy server for access to the ancillary device, enabling a fast update of device status and avoiding access conflicts.

A second aspect provides an information processing apparatus. The apparatus comprises: a processor; at least one I2C device; and a processor support chip. The processor support chip comprises a local service controller and a jointly addressable memory space and has an interface to the processor for the transfer of information therebetween. The processor support chip also has an interface for communication with a service processor; and an I2C interface for communication with the at least one I2C device. The local service controller has exclusive read and write access to the I2C interface; and is operable to maintain a data structure indicating a current value associated with the I2C device in the jointly addressable memory space for access by the processor and the service processor.

This arrangement provides an I2C proxy for the I2C device and provides a write-through cache for access thereto by other entities.

BRIEF DESCRIPTION OF THE FIGURES

Embodiments of the present invention will be described hereinafter, by way of example only, with reference to the accompanying drawings in which like reference signs relate to like elements and in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments and examples are described hereafter by way of example only in the following with reference to the accompanying drawings.

Figure 1:
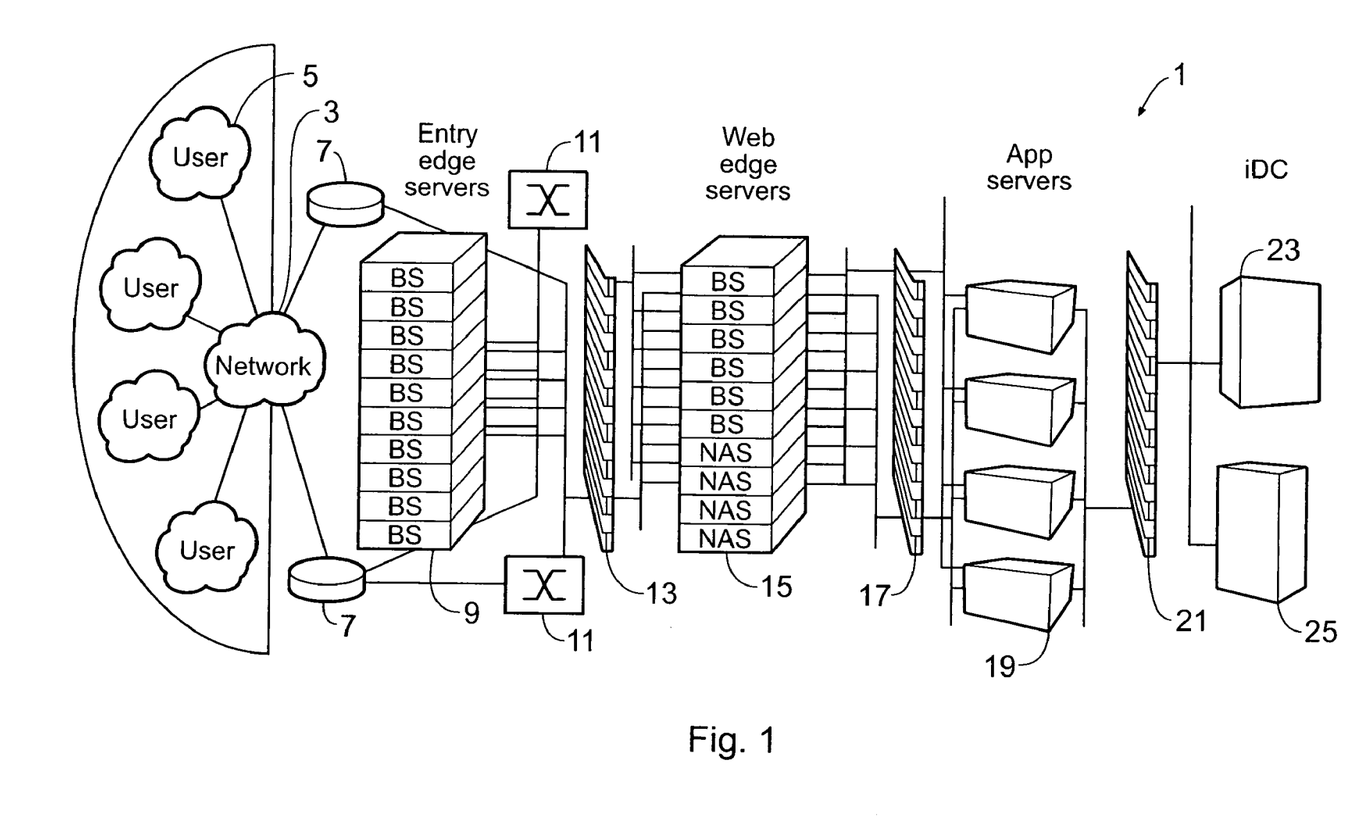
FIG. 1 is a schematic representation of an architecture of a multiprocessor system for supporting a web site being a first example of a computing environment.

Shown in FIG. 1 is a first example of a computing environment 1. This example is an application of a high capacity multiserver system 1 for implementing a network-connected web site such as, for example, an airline reservation system on the World Wide Web.

As shown in FIG. 1, an external network 3 (e.g., the Internet) for communicating with a user 5 can be connected to gateways 7 which can be connected to an entry edge server group 9 implemented by a web farm. The entry edge server group 9 forms an interface to the external network 3. The entry edge server group 9 can then be connected by switches 11 and a firewall 13 to a web edge server group 15 that can also be implemented as a web farm as shown in FIG. 1. The web edge server group 15 can serve to cache web pages that are readily accessible to users 5 accessing the system 1 from the external network 3, for example for checking flight times, etc. The web edge server group can comprise a number of blade server (BS) shelves and a number of network addressable storage (NAS) shelves for storing critical data. The web edge server group 15 can be further connected by a further firewall 17 to a plurality of application servers 19, which can be responsible for, for example, processing flight reservations. The application servers 19 can then be connected via a further firewall 21 to computer systems 23, 25, for example, e-commerce services including financial services for receiving and processing payment for airline reservations.

As will be appreciated, the server system described above with reference to FIG. 1 is only an example of a possible application for a multiprocessor server system. Multiprocessor server systems have many different applications and the present system is not limited to being applicable for use in only one or a limited number of such applications, rather multiprocessor server systems as described herein are operable for use in many different applications. A non-exhaustive list of such alternative applications includes: e-commerce web server systems; telecommunications network server systems; LAN application and file server systems and remote vehicle control systems.

Figure 2:
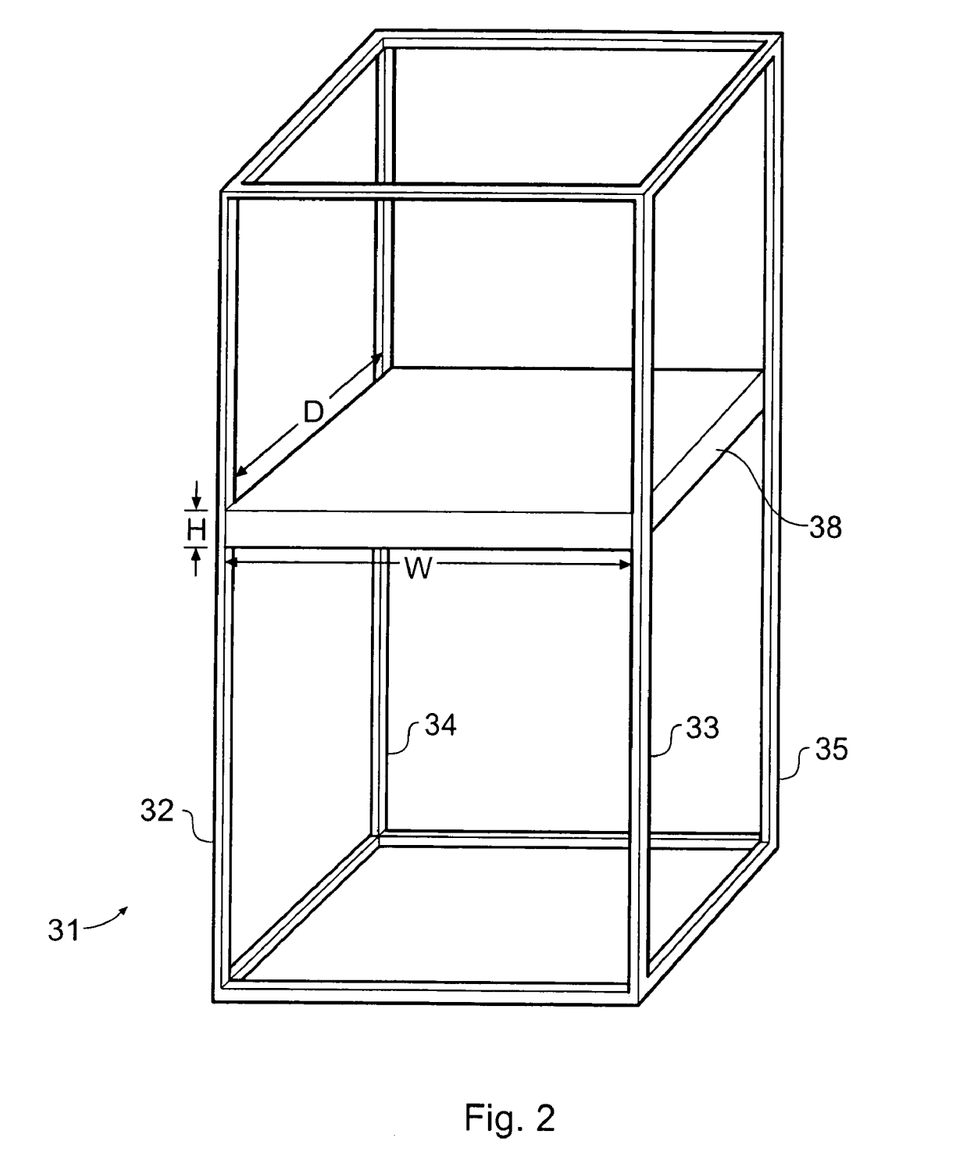
FIG. 2 is a schematic representation of a racking system incorporating an example of a computer system carrier in the foam of a rack-mountable shelf.

With reference to FIG. 2, there is shown a schematic perspective representation of a rack system 31 as viewed from the front including left and right front uprights 32 and 33 and left and right rear uprights 34 and 35. A rack system of this type may be used to implement one or more of the server groups shown in FIG. 1. The uprights can be formed with apertures for receiving shelf fixings (e.g., screws, bolts, clips, etc., for mounting brackets, slides, rails, etc.).

Also shown in FIG. 2 is an example of a server shelf 38 mounted in the rack system 31. The shelf 38 provides a housing in which the components of the server computer are located.

The term "shelf" is used herein in a conventional way to describe a structure that is mountable in rack system 31 and is configured to carry one or more components to form at least a part of a rack-mountable system. In the present example, the shelf 38 is three-dimensional, having a height (H), width (W) and depth (D). In the present example, one dimension (hereinafter described as the height, H) is smaller than the other dimensions (hereinafter described as the depth, D, and the width, W) to facilitate mounting of the shelf within the rack system 31. It will be appreciated that although the width and depth are typically constrained by the dimensions of the racking system for which the shelf is designed, there is more freedom as regard the height, subject to taking account of any appropriate standards and packaging considerations.

In the present example the shelf 38 includes at least one processor. The shelf is operable as at least one server. In one example, there is a minimum of one processor provided for each server. In other examples, a single processor may be shared by a plurality of logical server entities.

Figure 3:
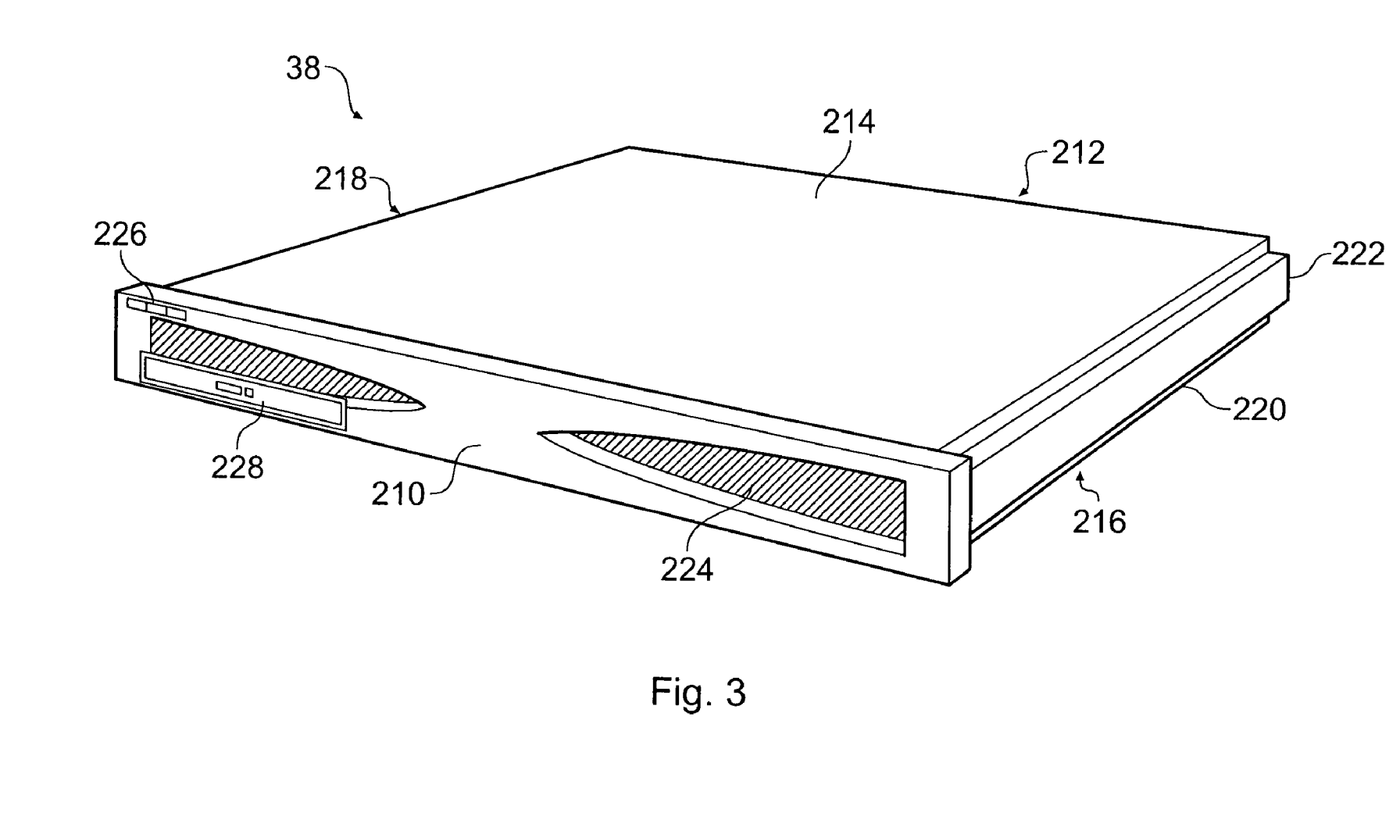
FIG. 3 is a schematic representation of an example of a rack mountable shelf for the racking system of FIG. 2.

The shelf 38 is shown in more detail in FIG. 3. The shelf can include top and bottom panels 214 and 216, side panels 218 and 220 and front and rear panels 210 and 212. The rear panel 212 can be provided with connectors (not shown) for connecting a power supply to the shelf and for connecting the shelf into one or more computer networks and can also be provided with ventilation apertures (not shown) for the flow of air into or out of the shelf. The side panels 218 and 220 can be provided with guide rails 222 for use in mounting the shelf into the racking system 31. The front panel 210 can include ventilation apertures 224 for the flow of air into or out of the shelf. A flow of air can be controlled by fans (not shown) which can cause air to enter the shelf via the apertures 224 and pass across components within the shelf and exit via apertures in the rear panel 212. The front panel can also have status indicator lights or LEDs 226 mounted therein for providing a visual indication of the operational status of the server housed within the shelf 38. The front panel 210 can also have mounted therethrough a removable media drive 228 such as a CD-ROM, a writeable CD, DVD-ROM, a writeable DVD, MO (magneto-optical), ZIP™ or floppy disk drive for the provision of data or software installation or updates to the server and/or for backup of data or software from the server.

Thus a first computing environment in which information processing devices are present has been described. A high capacity multiserver system of the type described above typically requires a high reliability of server systems utilised therein. In the stated example of an airline reservation system, extremely high availability of that system is essential for passengers to be able to book flights on the airline(s) using the reservation system. In another example, the high capacity multiserver system may be part of a communications network such as a telephone network. Again extremely high availability is required, in this example to ensure the telephone system is available for customers to make and receive calls. Therefore a high reliability of information processing cartridge is required.

Figure 4:
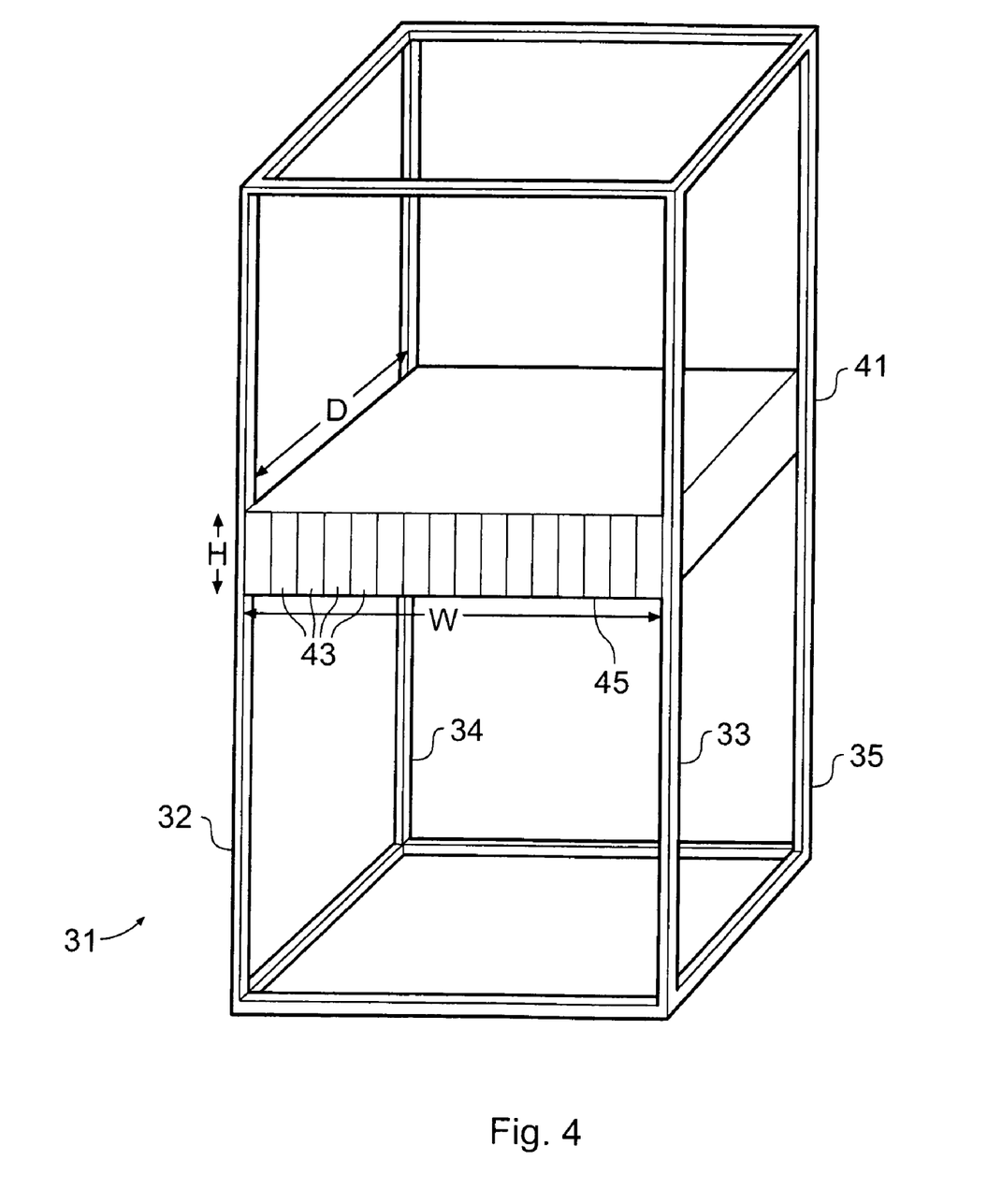
FIG. 4 is a schematic representation of a racking system incorporating another example of a computer system carrier in the form of a rack-mountable shelf.

Another example of a computing environment is shown in FIG. 4. With reference to FIG. 4, there is shown a schematic perspective representation of a rack system 31 similar to that shown in FIG. 2.

Also shown in FIG. 4 is an example of a blade server shelf 41 mounted in the rack system 31. The shelf 41 forms a carrier configured to carry a plurality of information processing cartridges 43 located side by side along the shelf.

Each of the information processing cartridges contains at least one processor. Each information processing cartridge in the present example is operable as a server. In some examples, the information processing cartridges can be configured as robust enclosed modules.

In the present example, the information processing cartridges, when aligned in the carrier shelf, look like rectangular slabs, or blades. Accordingly, an information processing cartridge can be described as a blade. The information processing cartridges 43 comprise information processing modules enclosed in an enclosure, or housing, so that the information processing modules have the form of cartridges. Also, as the information processing cartridges are to operate as computer servers in the example described in more, detail presently, an information processing cartridge 43 can also be described as a server blade. Accordingly, in the context of this example, the terms module, cartridge and blade are used interchangeably.

The illustrated example of a shelf 41 is configured to carry sixteen information processing cartridges 43, each of which is removably mountable in a respective opening 45 in the front of the shelf, whereby the information processing cartridges can be inserted into and removed from the front of the shelf 41 without removing the shelf 41 from the rack system 31.

Thus a second computing environment in which information processing devices are present has been described. A high capacity multiserver system of the type described above typically requires a high reliability of server systems utilised therein. In the stated example of an airline reservation system, extremely high availability of that system is essential for passengers to be able to book flights on the airline(s) using the reservation system. In another example, the high capacity multiserver system may be part of a communications network such as a telephone network. Again extremely high availability is required, in this example to ensure the telephone system is available for customers to make and receive calls. Therefore a high reliability of information processing cartridge is required.

Figure 5:
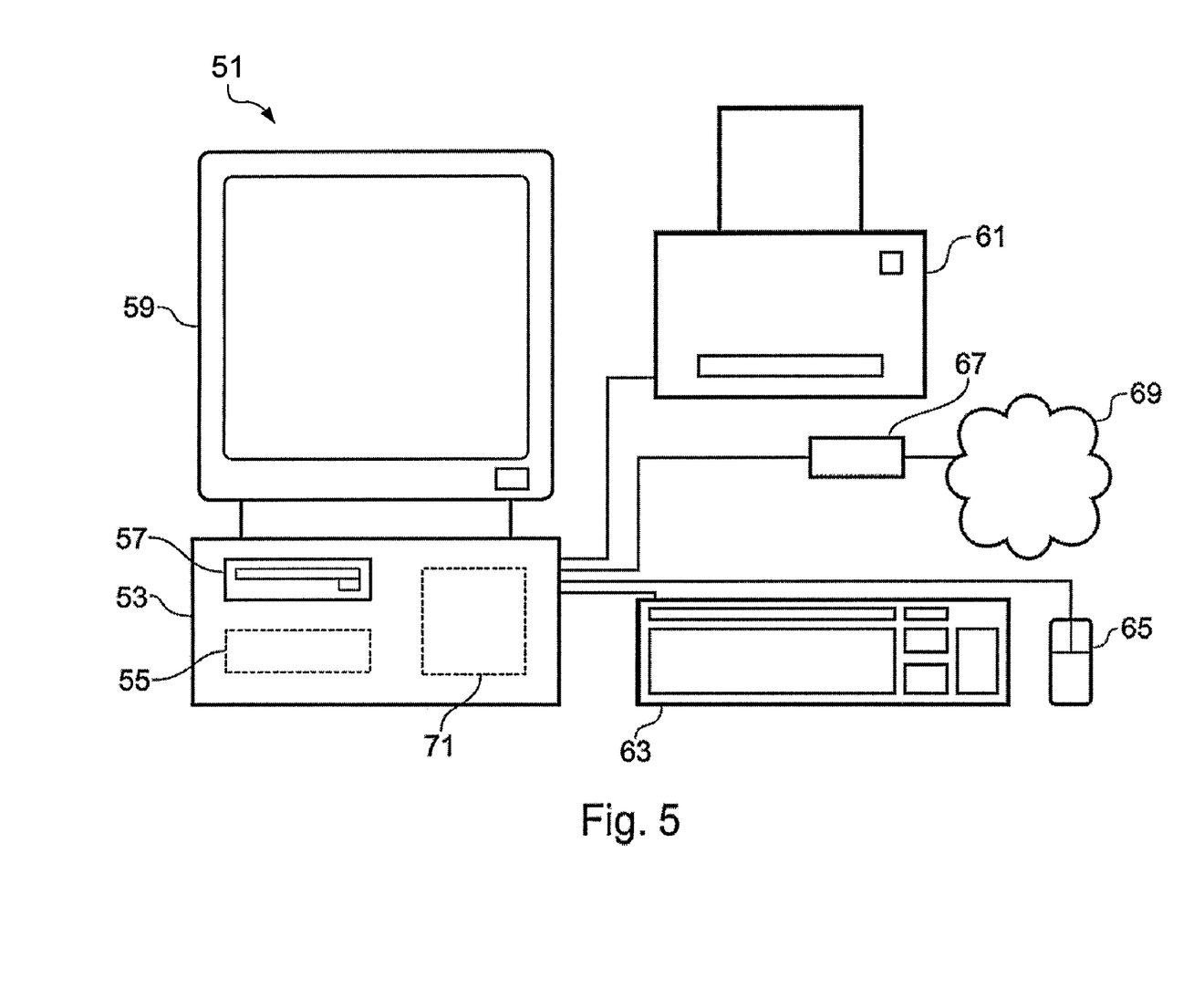
FIG. 5 is a schematic representation of a computer workstation, being another example of a computing environment.

Another example of a computing environment is shown in FIG. 5. This example is a computer workstation 51. The workstation 51 includes a computer base unit 53, within which is an information processing subsystem 71. The base unit 53 can include an internal storage device 55 (such as a hard disk drive) for data and instructions storage, and an external storage device 57 (such as a floppy disk drive, an optical disk drive for compact disks or digital versatile disks, a magneto-optical drive, a magnetic tape drive or a solid state memory device) for data or instructions storage.

The base unit 53 can provide a video output for causing text and/or images to be displayed on an attached display unit 59. The base unit can also provide an output for causing a physical record making device 61 such as a printer or plotter to create a printed output. Input to the base unit 53 can be provided by a keyboard 63 and/or mouse 65.

A remote network communication device 67 such as a PSTN modem (public switched telephone network modulator/demodulator), DSL modem, or network interface device can also be provided. The remote network communication device 67 allows the workstation 51 to communicate with other computing environments connected to a remote network 69, such as The Internet.

A computer workstation of this type may be used to control a number of facilities within an office environment, such as climate control and lighting. Thus it is required to have high availability and accountability to ensure that office workers have appropriate climate and light conditions to work. Should the system require restarting for any reason, the system needs to be able to be restarted with the maximum accountability so that any faults can be easily traced and rectified.

Figure 6:
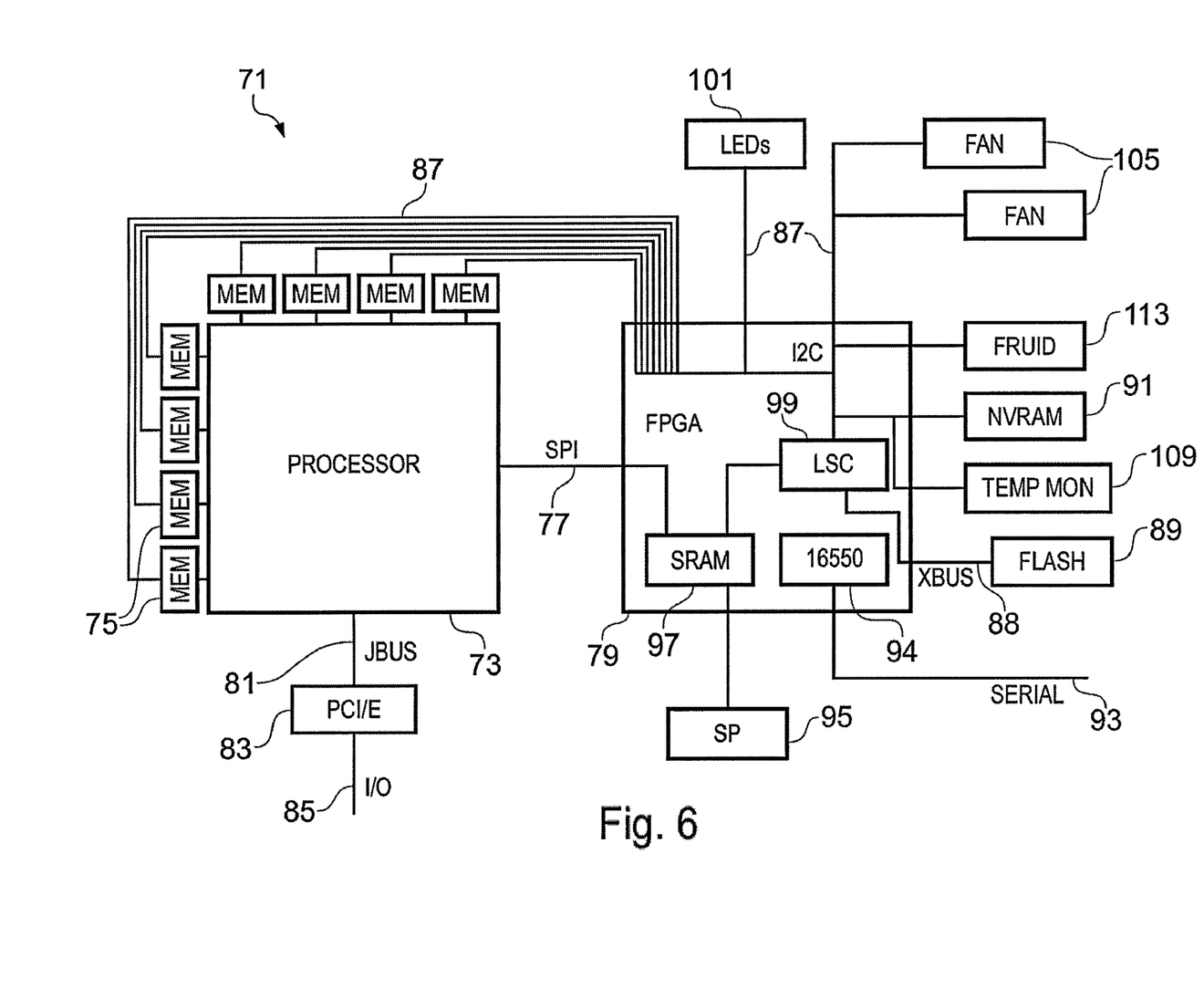
FIG. 6 is a functional block diagram of an example of part of an information processing subsystem for a computer system.

Thus there have been described three different computing environments in which a reliable and accountable information processing subsystem is utilised. With reference to FIG. 6, there will now be described an information processing subsystem suitable for deployment in a wide variety of computing environments.

FIG. 6 shows a part of an information processing subsystem 71 for a computer system. The subsystem 71 includes a microprocessor 73 which is provided with a plurality of memory modules 75. In the present example, the microprocessor 73 is a multi-core microprocessor, wherein each processor core of the microprocessor 73 is provided with a separate memory module 75. This microprocessor design corresponds to a new generation of microprocessors currently being developed by Sun Microsystems™. In other examples, alternative processors including the well-known SPARC™ and UltraSPARC™ processors from Sun Microsystems Inc., the x86 compatible processors from Intel and AMD corporations and the PowerPC processors from IBM corporation could be used.

The microprocessor 73 is operable to communicate with a processor support chip 79, which in the present example is provided by an FPGA (Field Programmable Grid Array), via an SPI (Serial Processor Interface) bus 77. The processor support chip 79 of the present example handles all of the support processes for the processor 73, for example bootstrap, system monitoring, management and many functions traditionally carried out by a Southbridge in x86 and similar computing systems.

The processor 73 of the present example is also provided with a JBus interface. JBus is an interface technology from Sun Microsystems Inc featuring a 128 bit packet switched, split transaction request and data bus providing high bandwidth and low latency. The JBus interface 81 enables the processor 73 to communicate with a PCI/E (Peripheral Component Interface Express) controller 83. In place of PCI/E, alternative I/O technologies such as InfiniBand™ or PCI/X may be used.

The PCI/E controller 83 provides conventional I/O channels 85 for communication with data storage devices such as hard disks and removable magnetic, optical or solid state disks and devices, as well as network devices for remote communication outside of the subsystem.

The processor support chip 79 is provided with I2C serial bus connections 87 for connecting to I2C components associated with the processor 73 and processor support chip 79. In order to provide for monitoring of the memory modules 75, they are connected to the processor support chip 79 via the I2C connections 87. Also provided and connected via I2C is NVRAM module 91 for storage of operational parameters of the processor 73 and processor support chip 79 during operation.

Connected to the processor support chip 79 via an Xbus or Ebus 88 is a FLASH PROM 89 for storing instructions for the boot procedure for the processor 73 and for storing configuration data and instructions for the processor support chip 79.

A serial connection 93 to the information processing subsystem 71 is provided via a UART 94 in the processor support chip 79. This serial connection can be controlled to allow a remote administrator (human or computer) to use a command line interface (CLI) to obtain information from and provide information and instructions to the processor 73.

The processor support chip 79 also has an interface for a service processor 95. The service processor 95 may be housed within the same module or casing as the information processing subsystem 71 or it may be provided in a separate physical entity. The service processor 95 may be configured to provide local management services for a number of separate information processing subsystems 71, which may all be located within a common housing or case, or may be in separate units. The service processor 95 can be given read access to an area of storage within the processor support chip 79 to facilitate efficient monitoring of the information processing subsystem with minimum overhead thereto. In the present example this area of storage is provided in the form of a SRAM 97 (described in more detail below).

The processor support chip 79 can also control and monitor a number of ancillary items which may be associated with a casing or housing in which the information processing subsystem 71 is housed. These can include status indicator LEDs 101. The LEDs can be used to indicate an operational status of the information processing subsystem and of other subsystems of an information processing apparatus of which the subsystem is a part. The LEDs can be controlled via the I2C connections 87.

The processor support chip 79 may also control and/or monitor one or more cooling fans 105. One or more of the cooling fans 105 may be arranged to cause a flow of cooling air through a housing or casing in which the information processing subsystem is located. One or more of the fans 105 may additionally or alternatively arranged to cause a flow of cooling air over specific components of the subsystem, for example the processor 73. The processor support chip can be arranged to monitor the speed of the fans and/or to control the speed of the fans. The monitoring and/or control of the fans can be performed via the I2C bus 87.

Also connected to the processor support chip 79 can be one or more temperature monitors 109. The temperature monitors 109 can be used to monitor temperature at various locations within a casing or housing in which the information processing subsystem 71 is located. Temperature monitoring sites may include a cooling flow inlet, a cooling flow outlet, and specific components such as the processor 73. The connection between the processor support chip 79 and the temperature monitor 109 can be the I2C bus 87. The processor support chip 79 I2C bus 87 can also provide a connection to a FRUID EEPROM 113. The FRUID EEPROM can contain a unique identifier by means of which a field replaceable unit (FRU) can be identified. In the present example, the FRUID EEPROM 113 can have an area of memory for the logging of data relating to system status events, such as system boot log data and software initialisation log data.

The processor support chip can be internally subdivided along functional lines. One part may be configured to facilitate the boot process for the processor 73 and another part may be configured as an information processing subsystem service controller (hereinafter referred to as local service controller or LSC) 99. The LSC 99 may be configured to communicate with the remote service processor 95 for the execution of management operations. Instructions for the operation of the LSC may be stored within the FLASH memory 89 as a part of the instructions for the operation of the processor support chip. Also within the processor support chip 79 can be provided a SRAM 97. The SRAM 97 can be used for temporary storage of operational data for any component monitored or communicated with by the processor support chip 79.

Although individual connections have been shown between the processor support chip and the various I2C connected devices, a multiplexer could be used for implementing the connections to those devices.

Thus there has now been described an information processing subsystem which can be used in a variety of different computing environments. The subsystem includes a processing engine, data I/O facilities for the processing engine and management facilities for the subsystem.

During operation of the information processing subsystem, there can be requirements for a plurality of different entities to access those devices which are communicated with via the processor support chip I2C bus interface. These entities can include the processor 73, service processor 95, and the LSC 99. Simply allowing each such entity to have full access to the I2C bus at all times could cause serious conflicts. For example, two entities could attempt to increment a given value at the same time, resulting in insufficient incrementing of the value, or two entities could attempt to switch a binary status, resulting in an incorrect final value for that binary status. In order to prevent potentially serious such bus conflicts, a bus management procedure can be implemented.

In the present example, the LSC 99 has sole access to the I2C bus interface of the processor support chip 79. In order to provide "access" to the I2C bus devices to other entities within the information processing subsystem, the LSC mirrors the information available over the I2C bus into memory locations of the SRAM 97. The LSC is operable to control all reads and writes from and to the I2C bus and updates the mirror in SRAM with any changes to the information from the I2C bus. Thereby there is no I2C polling load on the processor 73 or service processor 95 when accessing information relating to I2C devices. Thus relatively cheap I2C components are operated to provide a higher performance in terms of access latency than is possible if every device requiring access to an I2C device were to poll the I2C device in question every time access were required.

Figure 7:
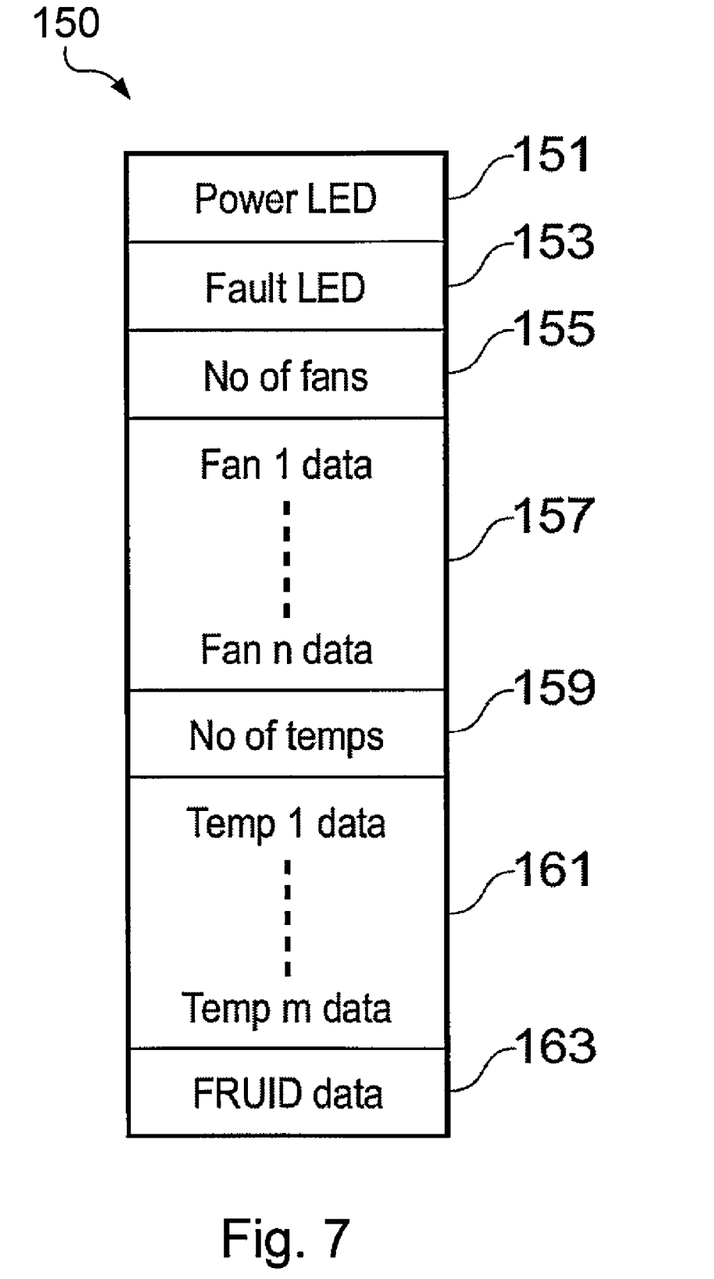
FIG. 7 is a schematic representation of a data structure for a shared information resource in the processor support chip of the subsystem of FIG. 6.

An example of a data structure 150 which can be used for representing the I2C information in the SRAM 97 is shown in FIG. 7. The data structure 150 of the present example includes fields for the LEDs, this includes a Power LED field 151 and a Fault LED field 153. The data structure can also include fields for the fans 105. In the present example, this includes a No of Fans field 155, which can contain data describing the number of fans which are accessible via the I2C bus, and a number of Fan data fields 157. There can be one fan data field for each fan accessible via the I2C bus, and the field can include fan speed information. The data structure can also include fields for the temperature monitors 109. In the present example, there can be a No of temps field 159, which indicates the number of measured temperatures available via the I2C bus, and a number of Temp data fields 161. There can be one field for each measured temperature available via the I2C bus.

The data structure can also include a FRUID Data field 163. This field is for details of the system event data which can be stored in the FRUID EEPROM 113 of the present example.

As the skilled reader will appreciate, the data structure may be altered to include other fields and to exclude some or all of the example fields in accordance with devices which are addressable via the I2C bus. In the present example, the data structure could by altered to include one or more fields relating to the memory modules 75, for example soft error count statistics.

By implementing a data structure representation of the I2C bus connected components in the described manner, it is possible for entities other than the LSC 99 to have no knowledge of the operation of the I2C bus or the devices attached thereto. The LSC 99 can be programmed to interface with the devices attached to the I2C bus, and provide data about those devices for access by other entities in a simple, formulaic structure. Thus the entities other than the LSC 99 need only know the data structure to access data for all of the I2C connected devices. Thus a generic, multi-accessible interface can be provided for system environmental information and platform data and control. Therefore the arrangement can be carried over to new arrangements of components without a need to re-write processor or service processor code for access to the I2C devices.

In the present example, the data structure 150 and I2C bus is managed by the LSC 99 such that all other entities (SP, processor etc) have read access to the data structure, but not write access. However, in the present example this fact is disguised to the clients (processor 73 and service processor 95) attempting to perform the writes. A client performing a write to an I2C device, writes to the relevant area of the data structure 150, which write instructions are intercepted by the LSC 99 without the requesting client being aware. The LSC 99 is operable to filter the intercepted write requests according to write permissions and to manage conflicting write requests, actually performing only those writes which are determined to be allowable. Thus the data structure 150 is operated as a write-through cache for the I2C devices.

Figure 8:
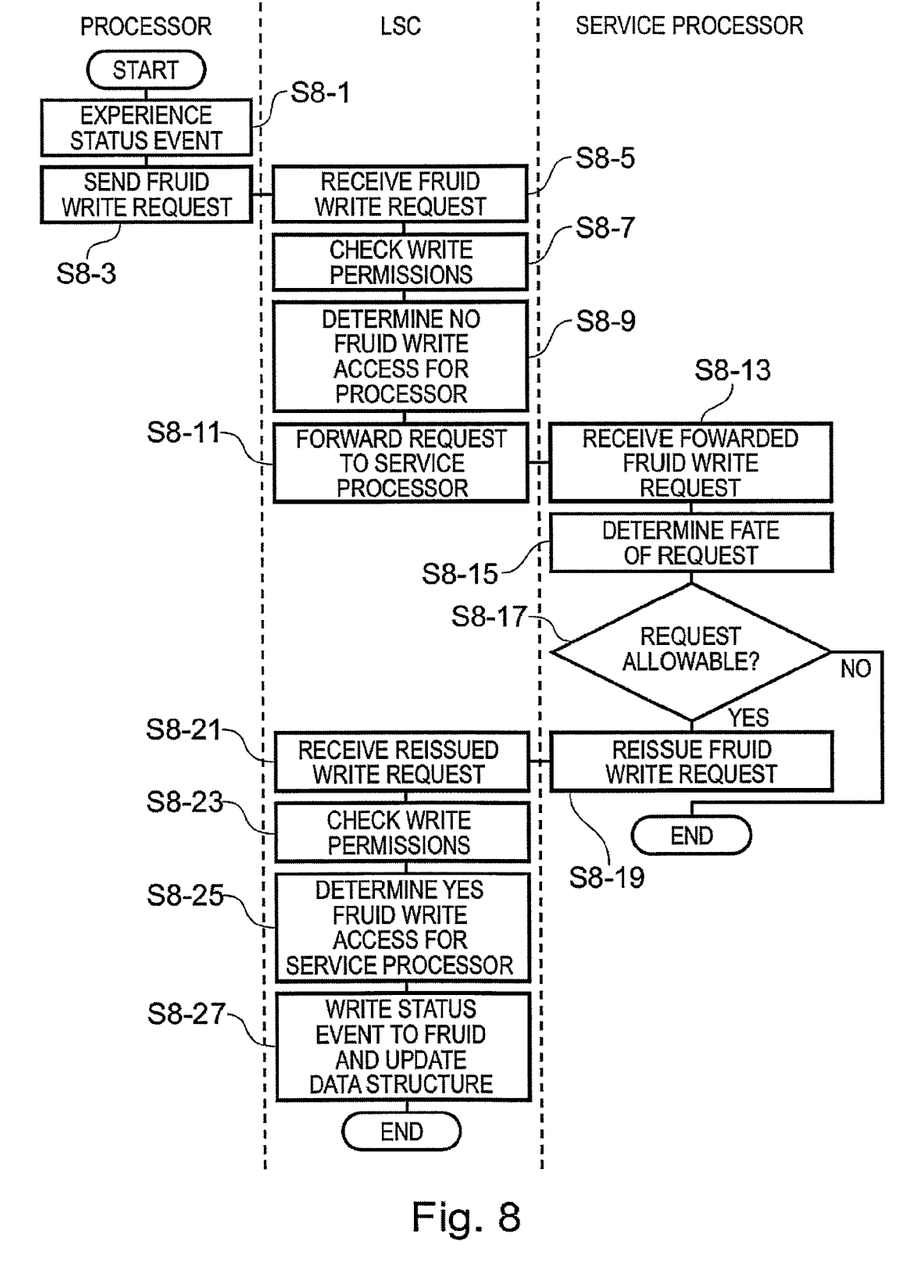
FIG. 8 is a flow chart showing steps performed during an example of a bus write operation.

An example of managing write permissions will now be described with reference to FIG. 8. At step S8-1, the processor 73 experiences a status events which it wishes to write to the FRUID fields 163 within the data structure 150. The processor 73 therefore writes to the data structure at step S8-3. The LSC 99 intercepts the write at step S8-5 and at step S8-7 checks the write permissions for the processor 73 to the FRUID fields 163. At step S8-9, the LSC 99 determines that the processor does not have write permissions to the FRUID fields 163, but that the service processor 95 does. The LSC 99, therefore forwards the request to the service processor 95 at step S8-11.

The service processor 95 receives the request at step S8-13, and at step S8-15 determines the fate of the request. That is to say, the service processor 95 analyses the request to determine whether the requested write is a write which should be allowed. Thus at step S8-17 a decision is taken as to whether the request is allowable. If the request is found not to be allowable, then processing ceases and the request is ignored. On the other hand, if the request is deemed allowable, processing continues at step S8-19 where the service processor 95 reissues the FRUID write request as a write to the data structure from the service processor itself. This reissued request is then intercepted by the LSC 99 at step S8-21, which then checks the write permissions for the service processor 95 to the FRUID fields 163 at step S8-23. At step S8-25 the LSC 99 determines that the service processor 95 does have the necessary write permissions, and therefore at step S8-27 the LSC 99 writes the status event data to the FRUID EEPROM 113 and updates the FRUID fields 163 in the data structure 150. Following this step the process ends.

Thus it can be clearly seen how write permission management can be implemented in the arrangement of the present example. As the skilled reader will appreciate, such a procedure, when performed may include a number of acknowledgement and handshake type exchanges between the entities involved. Such exchanges are not shown in the Figure in order not to obscure the concepts underlying the procedure. The selection of an appropriate extent of acknowledgement and handshake type exchanges and the implementation thereof would pose no difficulty to the skilled addressee.

Figure 9:
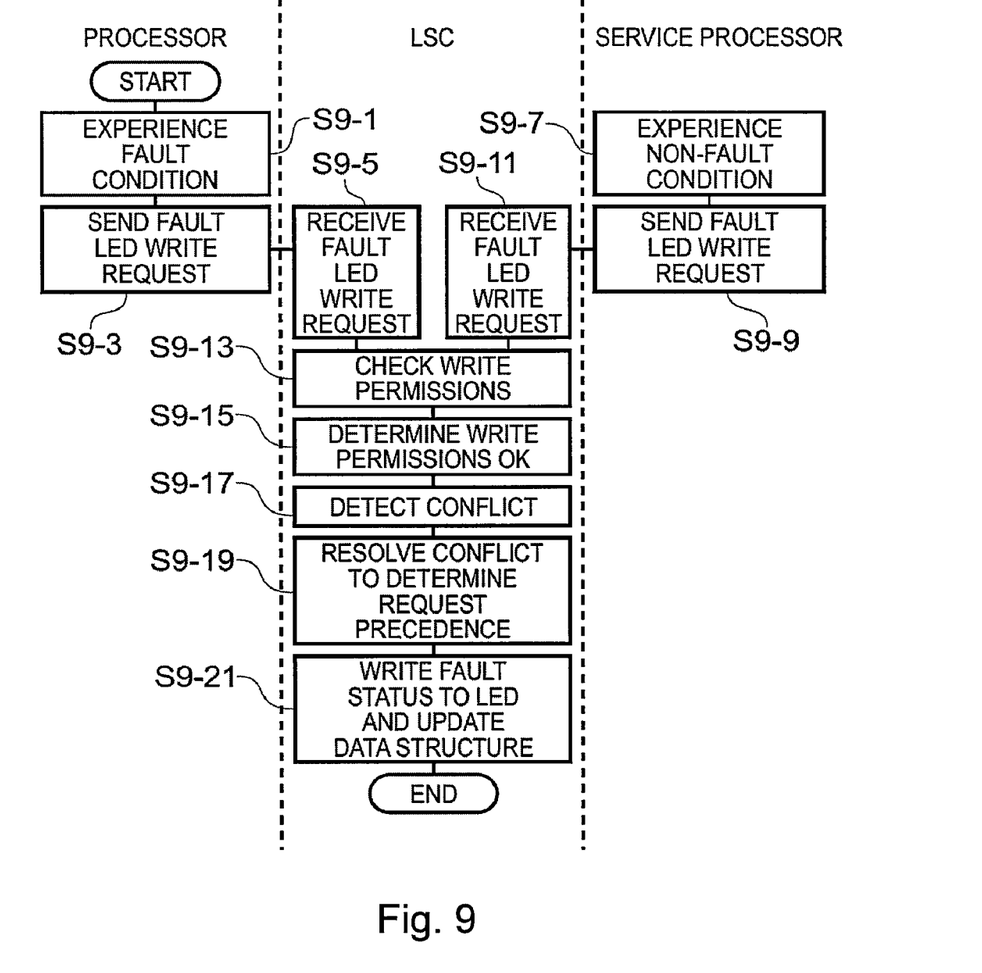
FIG. 9 is a flow chart showing steps performed during an example of a conflict detection and resolution operation.

Now, with reference to FIG. 9, an example of management by the LSC 99 of conflicting write requests will be described. First, at step S9-1, the processor experiences a fault condition, and therefore generates an instruction to illuminate the Fault LED of the LEDS 101, which is sent to the data structure at step S9-3. The request is intercepted by the LSC 99 at step S9-5. At substantially the same time, the service processor 95 experiences a non-fault condition (step S9-7), in response to which it generates an instruction to turn off the Fault LED of the LEDs 101, which request is sent to the data structure at step S9-9 and intercepted by the LSC 99 at step S9-11.

At step S9-13, the LSC 99 checks the write permissions for the respective requests and determines at step S9-15 that both requesting entities have permission to write to the Fault LED. Having established that both requesting entities have the right to modify the Fault LED status, the LSC 99 detects that there is a request conflict at step S9-17. That is to say, it has received two requests relating to the same field of the data structure, the two requests being opposites of one another. Therefore, at step S9-19, the LSC 99 undertakes conflict resolution processing to determine which request is to be performed and which ignored. In the present example, the LSC 99 examines the two requests and determines that if at least one entity wants the Fault LED illuminated, then there must be a fault condition somewhere and thus the request to illuminate the Fault LED is given precedence and the request to turn off the Fault LED is ignored. Thus at step S9-21, the LSC writes a fault status (i.e. "ON") to the Fault LED and updates the data structure 150 accordingly. Following this, the procedure ends.

Thus it can be clearly seen how write request conflict management can be implemented in the arrangement of the present example. As the skilled reader will appreciate, such a procedure, when performed may include a number of acknowledgement and handshake type exchanges between the entities involved. Such exchanges are not shown in the Figure in order not to obscure the concepts underlying the procedure. The selection of an appropriate extent of acknowledgement and handshake type exchanges and the implementation thereof would pose no difficulty to the skilled addressee.

The way in which the data structure 150 is updated by the LSC 99 whenever a write is performed to any of the I2C connected devices means that the new status of that device to be instantly viewed by the entities which have access to the data structure. Such immediate reporting of status is not normally available via an I2C bus directly, as most I2C devices require multiple commands and acknowledgements to gather data. Thus the data structure 150 acts as a write through cache for the I2C connected devices. Thereby, I2C device access latency is removed as far as the clients are concerned. This can have great advantages for overall performance of the information processing subsystem. For example, many processor and service processor routines typically involve accesses to ancillary devices. Such accesses may include patting a watchdog, sending status signatures or checking temperatures. By removing the bus latency (performing device polling etc) of the ancillary device for performing the access, such routines are not held up thereby. Thus low cost components can be used in such a way as to give a performance normally only available by using a more expensive component. As will be appreciated, the polling is performed by the LSC, which can be configured to have time to perform such polling without delaying other routines which it is executing.

Information relating to the write permissions can be stored within the LSC 99. Alternatively, this information can be stored as part of the data structure 150 within the SRAM 97. If the permissions information is stored in the SRAM then, upon system initialisation, the service processor can write the permissions to the data structure 150 for the LSC 99 to use in managing the I2C connected devices and components during system operation. In the event that the write permissions require altering during operation, the service processor 95 can be operable to access an override procedure to alter the write permissions at times other than system initialisation. In other examples, initial policies (write permissions etc) can be hard-coded or be configured from a client (typically the service processor 95). In some examples the policies can be protected to prevent any changes thereto during operation, such that policy alternations are either not possible, or possible only upon restarting of the processor support chip 79.

In the present example, the data structure is not fully standardised, rather the fields are stored as XML-type (eXtensible Markup Language) value pairs and as such be semi-self reporting. Thus for each field, the name and value (and attributes) are stored within the SRAM 97 as a value pair (or triplet).

Thus there has now been described an example of an information processing subsystem in which management by a controlling entity is used to provide reliability with respect to an I2C bus and connected devices. As will be appreciated, such high reliability of operation can be incorporated into a large variety of differently configured information processing subsystems. As will also be appreciated, the system described above is not limited to I2C connected devices. The processor support chip can be configured to provide the write-through cache for devices attached thereto by any appropriate interface, for example, serial (UART), parallel (IEEE 1294), universal serial bus, CAMs, Xbus, Ebus, and ISA bus interfaces.

According to the present example, such a processor support chip can be used in a variety of different information processing subsystems without any need to update the software of the processor or service processor (and any other client devices) provided that software is operable to use the write-through cache. Only the processor support chip need have any knowledge of the connected devices for which it provides the write-through cache. Thus processor and service processor software can be platform independent with all platform specifics lying in the processor support chip of the platform.

As will be appreciated, the data structure 150 need not be the only data held within the SRAM 97. A variety of other data may be stored therein for both private and public access by the different entities of the subsystem.

In the processor support chip described with reference to FIG. 4, the FLASH memory and at least a part of the service processor may be incorporated into the FPGA. The extent of the integration of the service processor into the FPGA may be influenced by the number of information processing subsystems which a given service processor is to monitor/manage and the boundary between functions to be executed by the LSC and functions to be executed by the service processor.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. An information processing apparatus comprising:
a processor;
at least one ancillary device; and
a processor support chip coupled to the processor and the at least one ancillary device, wherein the processor support chip includes a local service controller and a jointly addressable memory space, wherein the processor support chip further includes an interface to the processor for the transfer of information therebetween, an interface for communication with a service processor, and an interface for communication with the at least one ancillary device;
wherein the local service controller has exclusive read and write access to the ancillary device interface;
wherein the local service controller is operable to maintain a data structure indicating a current value associated with the at least one ancillary device in the jointly addressable memory space for access by the processor and the service processor;
wherein the local service controller is further operable to intercept access requests from the processor and the service processor requesting access to the at least one ancillary device, filter the intercepted access requests, and manage conflicting access requests.

2. The apparatus of claim 1, wherein the local service controller is operable to write an updated current value associated with the ancillary device to the ancillary device and to the data structure in response to receipt of a value update request from the processor or service processor.

3. The apparatus of claim 2, wherein a value update request from the processor or service processor takes the form of a value update request to the data structure.

4. The apparatus of claim 3, wherein the local service controller is operable to intercept the value update request for processing thereof.

5. The apparatus of claim 2, wherein a write permission value is associated with each of the at least one ancillary device, wherein the local service controller is operable to perform a value update request in dependence upon the write permission value.

6. The apparatus of claim 5, wherein the local service controller is operable to forward a value update request received for a value for which the originator of the request has a negative write permission value to an entity having a positive write permission value.

7. The apparatus of claim 2, wherein the local service controller is operable to compare multiple write requests to detect a conflict therebetween.

8. The apparatus of claim 7, wherein the local service controller is operable to perform conflict resolution processing to determine an outcome of a detected conflict.

9. The apparatus of claim 1, wherein the data structure is read-only to the processor and service processor.

10. The apparatus of claim 1, wherein the local service controller performs all polling on the ancillary device interface.

11. The apparatus of claim 1, wherein the ancillary device is an I2C device and the ancillary device interface is an I2C interface.

12. The apparatus of claim 1, wherein the ancillary device is a serial device and the ancillary device interface is a serial interface.

13. The apparatus of claim 1, wherein the ancillary device is an Xbus device and the ancillary device interface is an Xbus interface.

14. The apparatus of claim 1, wherein the ancillary device is a CAMs device and the ancillary device interface is a CAMS interface.

15. An information processing apparatus, comprising:
a processing engine;
at least one ancillary device;
a service processor;
a storage unit; and
a local service controller including an interface to the at least one ancillary device, an interface to the processing engine, and an interface to the service processor;
wherein the storage unit is directly addressable by the local service controller, the processing engine, and the service processor;
wherein the local service controller is operable to perform read and/or write operations with respect to the at least one ancillary device and to provide information relating to the at least one ancillary device in the store storage unit;
wherein the local service controller is further operable to intercept access requests from the processing engine and the service processor requesting access to the at least one ancillary device, filter the intercepted access requests, and manage conflicting access requests.

16. The apparatus of claim 15, wherein the local service controller is operable on receipt of a write request from the service processor, the processing engine, or the local service controller to perform a write operation to the at least one ancillary device.

17. The apparatus of claim 16, wherein the local service controller is operable to perform an write permission check upon receipt of the write request before performing the write operation.

18. The apparatus of claim 17, wherein the local service controller is operable to deny a write request if a negative result is obtained from the write permission check.

19. The apparatus of claim 17, wherein the local service controller is operable to forward the write request to an entity having an appropriate write permission if a negative result is obtained from the write permission check.

20. The apparatus of claim 16, wherein the local service controller is operable to update the information relating to the at least one ancillary device at substantially the same time as performing the write operation.

21. The apparatus of claim 15, wherein the local service controller is operable to compare multiple write requests to detect a conflict therebetween.

22. The apparatus of claim 21, wherein the local service controller is operable to perform a conflict resolution procedure in response to a detected conflict.

23. The apparatus of claim 15, comprising a plurality of ancillary devices and wherein the local service controller is operable to perform read and/or write operations with respect to each of the ancillary devices and to provide information relating to each of the one ancillary devices in the storage unit.

24. The apparatus of claim 23, wherein at least one ancillary device has a write permission associated therewith for each of the processing engine, the local service controller, and the service processor.

25. The apparatus of claim 24, wherein the local service controller is operable to provide information describing the respective write permissions along with the information relating to respective ones of the ancillary devices in the store storage unit.

26. The apparatus of claim 15, wherein the ancillary device is an I2C device and the interface to the ancillary device from the local service controller is an I2C interface.

27. The apparatus of claim 15, wherein the ancillary device is a serial device and the interface to the ancillary device from the local service controller is a serial interface.

28. The apparatus of claim 15, wherein the ancillary device is an Xbus device and the interface to the ancillary device from the local service controller is an Xbus interface.

29. The apparatus of claim 15, wherein the ancillary device is a CAMs device and the interface to the ancillary device from the local service controller is a CAMs interface.

30. An information processing apparatus comprising:

a processor;

at least one ancillary device; and a processor support chip coupled to the processor and the at least one ancillary device, wherein the processor support chip includes a local service controller and a jointly addressable memory space, wherein the processor support chip further includes an interface to the processor for the transfer of information therebetween, an interface for communication with a service processor, and an interface for communication with the at least one ancillary device;

wherein the local service controller is operable to maintain a data structure indicating a current value associated with the at least one ancillary device in the jointly addressable memory space for access by the processor and the service processor;

wherein the local service controller is operable to intercept access requests from the processor and the service processor, wherein the local service controller is operable to perform a write permission check upon receipt of an access request from either one of the processor and the service processor, wherein, if a negative write permission is detected, the local service controller is operable to forward the access request to the other one of the processor and the service processor for further processing.

* * * * *